(12) United States Patent
Wakamatsu

(10) Patent No.: US 6,231,053 B1
(45) Date of Patent: May 15, 2001

(54) GASKET FOR FUEL CELL

(75) Inventor: Shigeo Wakamatsu, Fujisawa (JP)

(73) Assignee: NOK Corporation, Tokyo (JP)

(*) Notice: Subject to any disclaimer, the term of this patent is extended or adjusted under 35 U.S.C. 154(b) by 0 days.

(21) Appl. No.: 09/420,251

(22) Filed: Oct. 18, 1999

(30) Foreign Application Priority Data

Jun. 11, 1999 (JP) ................................. 11-165400

(51) Int. Cl.⁷ ...................................... F16J 15/02
(52) U.S. Cl. ........................ 277/628; 429/38; 429/39
(58) Field of Search ..................... 277/593, 594, 277/595, 596, 597, 628, 639, 649, 611, 614

(56) References Cited

U.S. PATENT DOCUMENTS

| | | | |
|---|---|---|---|
| 4,666,579 | * | 5/1987 | Beaver et al. . |
| 5,145,190 | * | 9/1992 | Boardman ............................ 277/596 |
| 5,284,718 | * | 2/1994 | Chow et al. . |
| 5,928,807 | * | 7/1999 | Elias . |
| 5,945,192 | * | 8/1999 | Kato et al. . |

FOREIGN PATENT DOCUMENTS

| | | |
|---|---|---|
| 58-078372 | 5/1983 | (JP) . |
| 59-068171 | 4/1984 | (JP) . |
| 07153480 | 6/1995 | (JP) . |
| 07226220 | 8/1995 | (JP) . |
| 07263004 | 10/1995 | (JP) . |
| 07312223 | 11/1995 | (JP) . |
| 09231987 | 9/1997 | (JP) . |
| WO 9222096 | 10/1992 | (WO) . |

* cited by examiner

Primary Examiner—Terry Lee Melius
Assistant Examiner—Karlena D. Schwing
(74) Attorney, Agent, or Firm—Harness, Dickey & Pierce P.L.C.

(57) ABSTRACT

A gasket for fuel cells includes a gasket body composed of a metal or resin sheet and having openings, and a sealing section composed of a liquid rubber vulcanizate. The sealing section is bonded to the gasket body at low pressure. The inner face of each of the openings is covered with the sealing section. The gasket precludes generation of contaminants, such as ions, by the reaction of working fluids with the material constituting the gasket body, allowing high generating efficiency of the fuel cell.

30 Claims, 2 Drawing Sheets

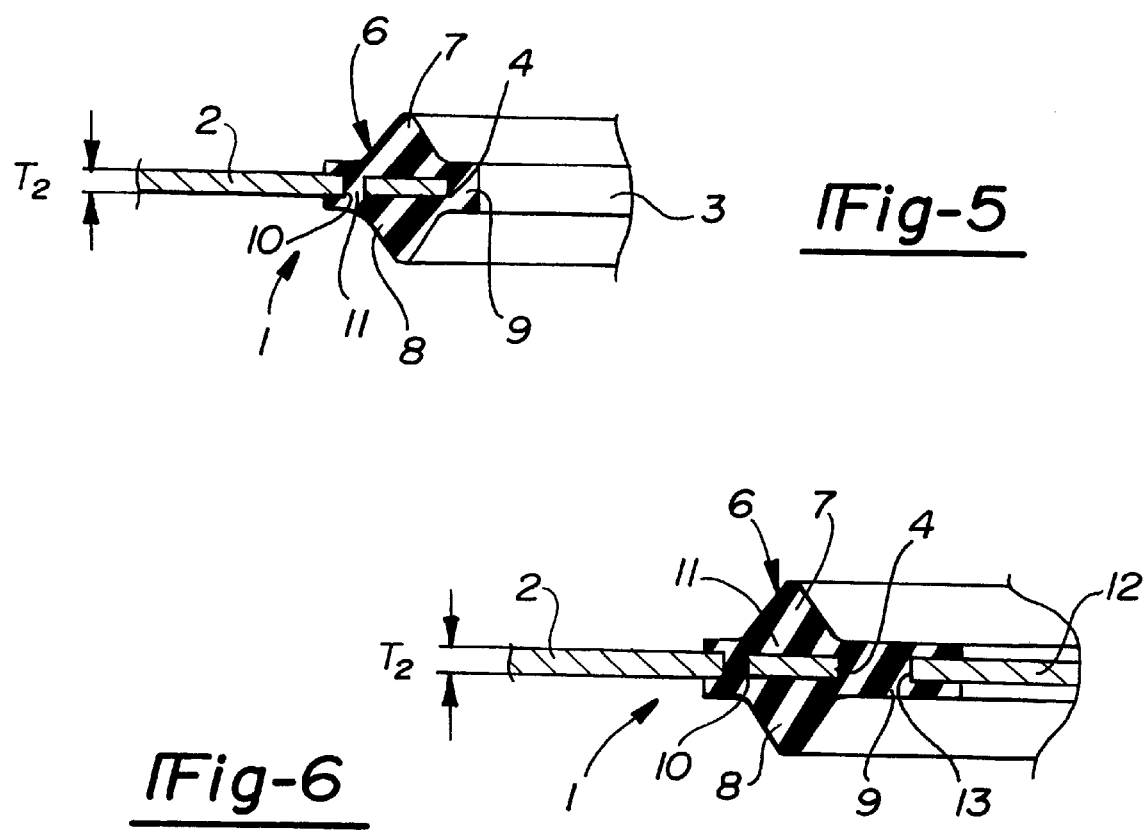

GASKET FOR FUEL CELL

BACKGROUND OF THE INVENTION

1. Field of the Invention

The present invention relates to gaskets as sealing devices, and particularly relates to a gasket for fuel cells, such as stacked fuel cells. The gasket supports a sheet, such as an electrolytic membrane, in a narrow region and seals working gasses and fluids, such as oxygen, nitrogen, hydrogen and water.

2. Description of the Related Art

In general, each "cell" of a fuel cell includes a pair of porous bipolar plates or collector separator electrodes and a pair of membrane and electrode assemblies (MEAs). Each MEA is composed of a polymer electrolyte membrane, a catalytic layer, and a reactive electrode layer. The MEA is sandwiched between two bipolar plates. The functional requirements in such a composite configuration or cell are, for example, a constant distance between the two adjacent bipolar plates, a high level of hermetic or low permeation sealing, precluding evaporation of water and drying of the polymer electrolyte membrane, and easy assembly and disassembly. Several adjacent "cells" form a fuel cell "stack".

Normally, the fuel cell stack is sealed with a curable bonding agent. This seal is effective initially, but it has a serious drawback because deteriorated curable bonding agent seals cannot be easily replaced with new ones.

Solutions for solving this problem are, for example, to provide sealing between fuel cell stacks using gaskets, such as disclosed in Japanese Patent Application Laid-Open Nos. 9-231987, 7-227220 and 7-153480, or using a composite gasket composed of a rubber sheet and a cellular or sponge layer, as disclosed in Japanese Patent Application Laid-Open No. 7-312223. These gaskets add to the overall thickness of the fuel cell stack and do not allow for easy assembly and disassembly.

Another solution includes using a composite gasket composed of a metal frame or sheet and a rubber layer. This has the following disadvantages:

A. Gaseous constituents in the fuel cell and cooling water react with the metal sheet to generate contaminating ions. This causes decreased electrical generating efficiency of the fuel cell.

B. Since the metal frame is relatively thick, in the range of 0.5 to 2 mm, a large fuel cell stack which includes approximately 100 cells is heavy and large.

C. Any distortion of the metal frame such as by warping will make positioning and assembly of the polymer electrolyte membrane difficult. This distortion can occur when a seating stress is applied to ensure sealing and as a result the metal frame will warp. The warped part causes curvature of the metal frame of the gasket, and thus making assembly of the fuel cell more difficult.

D. Since a large area is sealed, the fuel cell assembly requires a large compressive force. However, the compressive force of sealing changes significantly as the compressed height of the seal changes slightly, resulting in unstable sealing characteristics.

When assembling fuel cells, polymer electrolyte membranes are apt to be contaminated with dust or the like due to handling the sheets directly. Dust or the like influences the generating efficiency of the fuel cell. It is also difficult to position the sheet correctly in the predetermined position in the fuel cell because the membrane is thin and soft.

SUMMARY OF THE INVENTION

It is an object of the present invention to provide a gasket for fuel cells which solves the above-mentioned problems and has improved fuel cell electrical generating efficiency.

It is another object of the present invention to provide a gasket for fuel cells which is suitable for easy assembly.

It is another object of the present invention to provide a gasket for fuel cells which is compact in the size and the weight.

It is still another object of the present invention to provide a gasket for fuel cells which eliminates the need to handle the polymer electrolyte membranes directly.

A first aspect of the present invention is to provide a gasket for fuel cells comprising a gasket body including a metal frame and a resin sheet and having openings, and a sealing section including a liquid rubber vulcanizate, the sealing section being bonded to the gasket body, and the inner face of each of the openings is covered with the sealing section.

A second aspect of the present invention is a gasket for fuel cells which includes a gasket body comprising a metal frame and a resin sheet and having openings and at least one through-hole, and a sealing section comprising a liquid rubber vulcanizate. The sealing section is bonded to the gasket body, and the sealing section is integrally formed so as to pass through the through-hole in the body and cover the side face of each of the openings and the upper and lower faces of the gasket body in the vicinity of the each of the openings.

A third aspect of the present invention is a gasket for fuel cells which includes a gasket body comprising one of a metal frame and a resin sheet is disposed in the openings, and a sealing section comprising a liquid rubber vulcanizate. The sealing section is bonded to the gasket body and the outer portion of the polymer electrolyte membranes, in the body cover the side face of each of the openings and the upper and lower faces of the gasket body and the polymer electrolyte membranes in the vicinity of the each of the openings.

In the present invention, the inner face of each opening is entirely covered with the sealing section; as a result, the working fluid does not come into direct contact with the gasket body when the gasket is mounted in a fuel cell. Thus, the gasket body does not allow formation of contaminants, e.g., ions, which decrease the electrical generating efficiency of the fuel cell. Accordingly, the fuel cell including the gasket has high generating efficiency.

In the second aspect, the sealing section can be tightly fixed to the gasket body without a bonding agent so as to surround the edge portion including the through-hole and each opening. Since a bonding agent is not used for bonding between the gasket body and the sealing section, a fuel cell using this gasket will not cause a decrease in generating electrical efficiency due to any chemical reactions with the bonding agent. Furthermore, the process of applying a bonding agent is not necessary for adhering the gasket body to the frame. Thus, the manufacturing process of the gasket is simplified.

In the first and second aspects, the gasket body preferably has a thickness in a range of 0.03 to 0.3 mm. The distance between two adjacent bipolar plates can be decreased when this gasket body is mounted between them. Thus, a fuel cell using this gasket will have improved electrical generating efficiency and be thinner and lighter.

In the third aspect, the sealing section can be tightly bonded to the gasket body and the polymer electrolyte. Any contamination of the polymer electrolyte membrane can be effectively prevented because there is no need to handle directly the membrane and precise positioning of the membrane can be accomplished because the membrane is tightly bonded to the rigid gasket. Any change in size of the membrane caused by pressure of the working liquid or fuel gas or temperature during use can be effectively absorbed by the sealing section because the sealing section is made of relatively compliant soft material such as liquid rubber.

BRIEF DESCRIPTION OF THE DRAWINGS

FIG. 5 is a partial cross-sectional view of a gasket for fuel cells in accordance with a fourth embodiment of the present invention; and FIG. 6 is a partial cross-sectional view of a gasket for fuel cells in accordance with a fifth embodiment of the present invention.

DETAILED DESCRIPTION OF THE PREFERRED EMBODIMENTS

The preferred embodiments of the present invention will now be described with reference to the attached drawings.

First Embodiment

Figure 1:
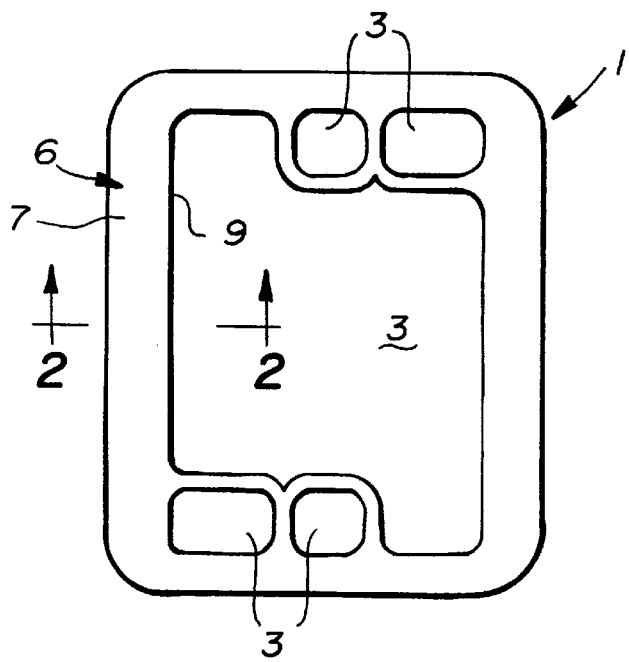
FIG. 1 is a plan view of a gasket for fuel cells in accordance with a first embodiment of the present invention.
Figure 2:
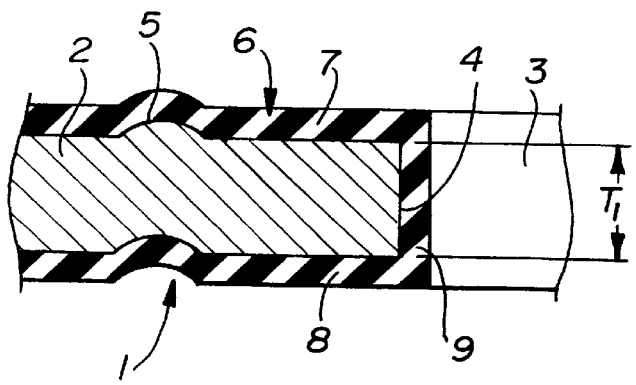
FIG. 2 is an enlarged cross-sectional view taken along line 2—2 in FIG. 1.

FIG. 1 is a plan view of a gasket for fuel cells in accordance with the first embodiment, and FIG. 2 is an enlarged cross-sectional view taken along line 2—2 in FIG. 1.

With reference to FIG. 1, a gasket 1 in this embodiment has an overall rectangular planar shape. At least two more openings 3 are formed in the plane. These openings 3 are formed in the thickness direction of the gasket 1 so that gas, such as oxygen, nitrogen and hydrogen, and working fluids, such as water, can circulate or flow through in the openings 3.

With reference to FIG. 2, the gasket 1 has a flat gasket body or frame 2 which is composed of a metal or a polymer resin. Alternatively, the frame 2 is made of metal such as steel or stainless steel, and alternatively, the polymer resin is polyamide or nylon, or stanyl or polyethylene terephthalite (PET) or polybutalene terephthalite (PBT) or similar thermoplastic materials or alternatively, a thermoset plastic material such as polyester or vinylester. Openings 3 are formed in the gasket body 2. The gasket body 2 has a projection 5 having an arcuate cross-section on the upper face thereof in order to locally enhance the high line sealing forces or the seal seating stresses. The projection 5 is a bead extending from the upper face of the gasket body. The gasket body 2 in this first embodiment has a thickness $t_1$ of approximately 2 mm. However, this is not a limitation as to the application of the scope of the invention and the gasket thickness can vary from 0.5 mm to 3.0 mm.

The gasket body 2 is covered with a sealing bead or sealant 6 composed of an elastic material which forms an upper sealing section 7 on the upper face, a lower sealing section 8 on the lower face, and an inner sealing section 9 on the inner face of each opening. The sealing section 6 is bonded to the gasket body 2 with a bonding agent well known in the art. The upper, lower and inner sealing sections 7, 8 and 9 are integrally formed using a liquid rubber vulcanizate having a JIS-A hardness of 60 or less (JIS being the abbreviation for Japanese Industrial Standard). The liquid rubber vulcanizate is a platinum cure silicone or fluorosilicone or a similar elastomeric material well known in the art. The liquid rubber vulcanizate is injected as a liquid at low pressures ranging from 2.0 Mpa to 10.0 MPa into a mold containing the gasket frame. By using low injection pressure to inject the rubber vulcanizate into the mold, thr rubber does not modify, alter or tear the gasket body 2 even though the body thickness is very thin and does not have great strength. Once injected into the mold, the liquid rubber vulcanizate begins to heat up because of its contact with the heated molds and once it reaches a threshold temperature, the liquid rubber begins to crosslink or vulcanize and forms an elastomeric seal which is bonded to the body 2.

The gasket clamps an electrolyte membrane 12 such as made of fluorine—containing material such as Nafion® which is commercially available under the trademark of DuPont and Company of Wilmington, Del., which is disclosed in Patent Cooperation Treaty Patent No. WO 971 5 D139, and which is incorporated herein by reference, in a relatively narrow region in a stacked fuel cell to seal the working gasses and fluids, such as oxygen, nitrogen, hydrogen and water, which have a pressure of 0.5 MPa. The polymer electrode membrane 12 extends to the opening 3 so that the gasket 1 and an accompanying gasket 1' are located on each side of the membrane 12.

Since the inner face 9 of each opening 3 is entirely covered with the sealing section 6, the working fluid does not come into direct contact with the gasket frame 2 when the gasket 1 is assembled in a fuel cell. Thus, the gasket body 2 does not allow the formation of contaminants, e.g., ions, which can decrease electrical generating efficiency of the fuel cell. Accordingly, the fuel cell which includes the gasket 6 has high electrical generating efficiency.

The gasket body 2 is entirely covered with the sealing section 6 consisting of the integrally formed upper, lower and inner sealing sections 7, 8 and 9. Thus, the sealing section 6 will not detach from the gasket body 2 even if the sealing section 6 does not tightly adhere to the gasket body 2. Thus, the gasket body 2 which is covered with the sealing section 6 can simplify the coating step necessary for applying a bonding agent, and thus improve assembly efficiency of the gasket 1 in a fuel cell.

Second Embodiment

Figure 3:
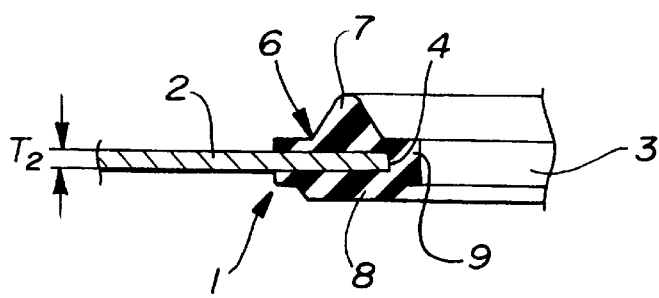
FIG. 3 is a partial cross-sectional view of a gasket for fuel cells in accordance with a second embodiment of the present invention.

With reference to FIG. 3, in a gasket 1 of the second embodiment, only the peripheral section of each opening 3 of a gasket body 2 is covered with a sealing section 6. The gasket 1 has a flat body 2 composed of a metal or polymer resin, as described in the first embodiment, and has at least one opening 3. The gasket body 1 is very thin having a thickness $t_2$ of 0.03 to 0.5 mm.

The peripheral section of each opening 3 of the gasket body 2 is covered with and bonded to a sealing or packing section 6. Thus, the inner face 4 of the opening 3 is entirely covered with the sealing section 6 to form an upper sealing section 7 on the upper face, a lower sealing section 8 on the lower face, and an inner sealing section 9 on the inner face of each opening. The sealing section 6 is composed of the same liquid vulcanizate rubber material as that disclosed in the first embodiment. The upper sealing section 7 has a sealing bead which has a triangular, round or circular cross-section. The lower sealing section 8 has a trapezoidal cross-section and a flat top face. The height of the lower sealing section 8 is smaller than the height of the upper sealing section 7.

The gasket clamps an electrolyte membrane in a relatively narrow region (a width of approximately 1.5 mm) in a stacked fuel cell to seal the working gases and fluids, such as oxygen, nitrogen, hydrogen and water, and which has a pressure of 0.5 MPa.

Since the inner face 9 of each opening 3 is entirely covered with the sealing section 6, the working fluid does not come into direct contact with the gasket body 2 when the gasket 1 is mounted in a fuel cell. Thus, the gasket body 2 does not allow the formation of contaminants, e.g., ions, which decrease the electrical generating efficiency of the fuel cell. Accordingly, the fuel cell including the gasket 6 has high electrical generating efficiency.

The gasket body 2 is entirely covered with the sealing section 6 consisting of the integrally formed upper, lower and inner sealing sections 7, 8 and 9. Thus, the sealing section 6 will not detach from the gasket body 2 even if the sealing section 6 does not tightly adhere to the gasket body 2. Thus, the gasket body 2 covered with the sealing section 6 can simplify the coating step for applying a bonding agent and thus improves assembly performance of the gasket 1 in a fuel cell.

Since the thickness $t_2$ of the gasket body 2 is relatively thin, that is, 0.03 to 0.5 mm, the distance between two adjacent bipolar parts can be decreased when the gasket 1 is used. Thus, a fuel cell using the gaskets 1 will have improved electrical generating efficiency, decreased size and decreased weight. The thickness $t_2$ may be further decreased when the moldability, shrinkage, stress relaxation and shape of the sealing section 6 is taken into consideration and assembly of a fuel cell.

The sealing section 6 comes into close contact with an adjacent bipolar plate to generate a reactive or highline sealing force (that is, the seating stress) required for sealing. In this embodiment, the gasket body 2 does not have a projection. Thus, warping of the gasket 1 will not occur, and assembly of the fuel cell can be simplified. Furthermore, assembly is accomplished with a small clamping force. Thus, any change in seal reactive force is small and a stable sealing system is achieved.

This partial sealing configuration allows a wide variety of gasket design configurations.

In addition, the gasket can be mounted in the fuel cell without direct contact of the sealing section 6 with the hands of an installer. Thus, the sealing section 6 is protected from contamination from dirt and dust during assembly.

The lower sealing section 8, having a trapezoidal cross-section, can suppress or reduce the inclination of the mounted gasket 1, and thus improve sealing characteristics.

Third Embodiment

Figure 4:
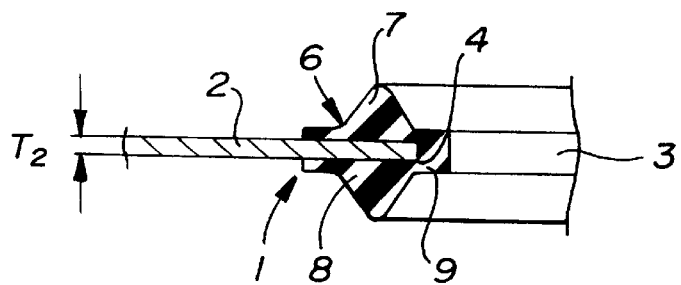
FIG. 4 is a partial cross-sectional view of a gasket for fuel cells in accordance with a third embodiment of the present invention.

With reference to FIG. 4, a gasket 1 in the third embodiment has a sealing section 6 which has an upper sealing section 7 on the upper face and a lower sealing section 8 on the lower face having a triangular cross-sectional shape the same as that of the upper sealing section 7 in the second embodiment. In this sealing configuration, any change in reactive or highline sealing force due to a change in the number of bipolar plates is further decreased. Thus, the gasket has further stabilized sealing characteristics, in addition to the advantages in the second embodiment.

Fourth Embodiment

With reference to FIG. 5, in a gasket 1 in the fourth embodiment, has a sealing section 6 is provided only on the periphery of each opening 3 of a flat gasket body 2 which is composed of a metal or polymer resin, as in the second and third embodiments. The thickness $t_2$ of the gasket body 2 is approximately 0.03 to 0.5 mm.

The gasket body 2 has a plurality through-holes 10 in the vicinity of each opening 3. The sealing section 6 is integrally formed so that the sealing section 6 passes through the through-hole 10 and covers the inner face and the periphery of the opening 3. The upper sealing section 7 and the lower sealing section 8 have projections having relatively high circular cross-sections. In such a configuration, the sealing section 6 is integrally provided so as to surround the edge portion including the through-holes 11 and the opening 3. Thus, the sealing section can be made to adhere to the gasket body 2 without a bonding agent. The plurality of through-holes at a given interval may be provided in the vicinity of the opening 3 to form a mechanical lock and enhance bonding or connection between the gasket body 2 and the sealing section 6.

This gasket 1 has the following advantages, in addition to the above mentioned advantages.

Since no bonding or adhesive agent is used for bonding between the gasket body 2 and the sealing section 6, a fuel cell using this gasket will not cause a decrease in electrical generating efficiency due to a chemical reaction of the bonding agent. Furthermore, a coating of a bonding agent or adhesive is not necessary for assembling the gasket 1. Thus, the manufacturing process for gasket 1 of the fourth embodiment is simplified.

In this embodiment, the lower sealing section 8 on the lower face may have the same cross-sectional shape as that in the second embodiment, further improving sealing characteristics. Those skilled in the art will recognize that through-holes 11 may also be employed in practicing the seal or third embodiments so as to mechanically lock the sealing section 6 or the upper sealing section 7 to the lower sealing section 8.

Fifth Embodiment

With reference to FIG. 6, in a gasket 1 in the fifth embodiment, and the preferred embodiment, a sealing section 6 is provided only on the periphery of each opening 4 of a flat gasket body 2 which is composed of a metal or polymer resin, as previously described in the first, second and third embodiments. The thickness $t_2$ of the gasket body 2 is approximately 0.03 to 0.5 mm.

The gasket body 2 has a through-hole 10 in the vicinity of each opening 4 to form a mechanical lock. The dimension of the through-hole is about 0.3 mm to about 1 mm in diameter. These through-holes are disposed at intervals of about 10 mm apart. The upper sealing section 7 and the lower sealing section 8 have projections having relatively convex circular cross-sections. Specifically, the top of the sealing section 7 and 8 have a tip portion all around each sealing portion 7 and 8. The sealing section 6 is made of a liquid vulcanizate rubber or an elastic material, as described previously in the first and second embodiments. The inner periphery 4 of the opening is covered by the elastic rubber 6. As stated earlier, the polymer electrolyte membrane 12 is located in the opening 3. The outer periphery of the membrane 12 is nipped and fixed all around the outer periphery of the membrane as shown in FIG. 6. The inner periphery 4 of the opening of the gasket may contact with the outer periphery 13. Preferably, there is no contact between the inner periphery 4 of the opening 3 and the outer periphery 13 of the membrane 12. In this configuration, the sealing section 6 is integrally formed so as to surround the edge portion including the through-hole 11 and the opening 4, and the outer edge portion of the membrane in one body. The sealing section 6 bonds to the membrane 12. A through-hole can be provided in the vicinity of the outer periphery of the membrane, similar to the through-hole 11 used in the gasket to secure the bonding between them. Thus, the sealing section 6 can be tightly fastened or fixed to the gasket body 2 and to the membrane 12 without a bonding agent. A plurality of through-holes at a given interval (10 mm or so) may be provided in the vicinity of the opening 3 to enhance the bond between the gasket body 2 and the membrane 12 and the sealing section 6. Usually one sheet of polymer electrolyte membrane is used with one gasket.

This gasket 1 has the following advantages, in addition to those mentioned previously. Since no bonding agent is used for bonding between the gasket body, the sealing section and the polymer electrolyte membrane, fuel cells using this gasket will not create a decrease in electrical generating efficiency due to a chemical reaction with the bonding agent. As the polymer electrolyte membrane is fixed to the gasket through the sealing section, there is no need for us to directly handling the polymer electrolyte membrane during the assembly process of the fuel cells, so that contamination by contacting the membrane can be effectively prevented. Furthermore, the assembly process becomes streamlined because the polymer electrolyte membrane can be simultaneously assembled to the gasket. Precise positioning of the polymer electrolyte can be accomplished easily because the polymer electrolyte membrane is fixed tightly to the rigid gasket. There is another advantage, in the gasket with the electrolyte membrane, that the change in the membrane's thickness caused by the pressure of the working liquid or fuel gas or temperature can be effectively absorbed by the sealing section which is soft in hardness and compliant. The load added on the membrane is considerably reduced, thereby increasing the life of the fuel cell.

What is claimed is:

1. A gasket for sealing gases in a fuel cell, said gasket comprising:
   a gasket body having an upper face, a lower face and at least one opening, said opening having an inner face;
   a sealing section on said gasket body, said sealing section formed of a liquid rubber vulcanizate, said sealing section formed on said upper face and said lower face and extending over said inner face to form an integral seal, said sealing section preventing the gases from coming into direct contact with said gasket body and preventing the formation of contaminants which decreases the electrical generating efficiency of the fuel cell; and
   a polymer electrolyte membrane member adjacent to said sealing section, said membrane member having an outer portion, said sealing section attached to said gasket body and to said outer portion so as to absorb any change in size of said membrane member.

2. A gasket as claimed in claim 1 wherein said electrolyte membrane member is made of a fluorine containing material.

3. A gasket as claimed in claim 1 wherein said liquid rubber vulcanizate is selected from the group consisting of silicone and fluorosilicone.

4. A gasket as claimed in claim 1 wherein said gasket body having a projection, said projection having an arcuate portion which extends above said upper face.

5. A gasket as claimed in claim 1 wherein said sealing section on said upper face to form a high line sealing force.

6. A gasket as claimed in claim 1 wherein said sealing section is bonded to said gasket body to cover said inner face of said at least one opening to prevent the working gases from coming into direct contact with said gasket body and the formation of contaminates which can decrease the electrical generating efficiency of the fuel cell.

7. A gasket as claimed in claim 1 wherein said sealing section having a triangular cross-section.

8. A gasket as claimed in claim 1 wherein said sealing section having a trapezoidal cross-section.

9. A gasket as claimed in claim 1 wherein said sealing section on said upper face having a triangular cross-section and said sealing section on said lower face having a trapezoidal cross-section.

10. A gasket as claimed in claim 9 further comprising a plurality of through holes extending from said upper face to said lower face so as to connect said sealing section on said upper section to said sealing section on said lower section.

11. A gasket as claimed in claim 1 wherein said sealing section on said upper face having a triangular cross-section and said sealing section on said lower face having a triangular cross-section.

12. A gasket as claimed in claim 1 wherein said polymer electrolyte membrane member is contiguous to said sealing section.

13. A gasket as claimed in claim 1 wherein said polymer electrolyte membrane member disposed in said at least one opening, the edge of said membrane being adjacent to said gasket body, said sealing section extending from said inner face and connecting to said membrane.

14. A gasket as claimed in claim 1 wherein said gasket body has a thickness in the range of 0.03 to 3.0 mm.

15. A gasket as claimed in claim 1 wherein said gasket body is formed of a metal.

16. A gasket as claimed in claim 1 wherein said gasket body is formed of a polymer resin.

17. A gasket as claimed in claim 1 wherein said sealing section having a flat top face.

18. A gasket for fuel cells with working gases, said gasket comprising:
   a gasket body having an upper face, a lower face and at least one opening, said opening having an inner face,
   a sheet of polymer electrolyte membrane member disposed in said opening, and
   a sealing section on said gasket body, said sealing section formed of a liquid rubber vulcanizate at low pressure, said sealing section extending from said gasket body to said membrane member to secure said membrane member to said gasket body to prevent contamination of said membrane member during handling.

19. A gasket as claimed in claim 18 further comprising a plurality of through-holes in said gasket body to mechanically lock said sealing section to said gasket body.

20. A gasket as claimed in claim 19 wherein said plurality of through-holes are adjacent to said opening.

21. A gasket for sealing gases within a fuel cell, said gasket comprising:
   a gasket body having an upper face, a lower face and at least one opening, said opening having an inner face;
   a sheet of fluoropolymer electrolyte member disposed in said opening; and
   a sealing section on said gasket body, said sealing section being formed of liquid vulcanizate rubber material, said sealing section having an upper section on said upper face, a lower section on said lower face and an inner section on said inner face, said sealing section having an integrally formed seal which extends from said upper section over said inner section to said lower section, said sealing section preventing the gases from coming into direct contact with said gasket body and preventing the formation of contaminants which decrease the electrical generating efficiency of the fuel cell.

22. A gasket as claimed in claim 21 wherein said gasket body being formed of a polymer resin, said resin having a thickness between 0.03 to 0.5 mm.

23. A gasket as claimed in claim 21 wherein said gasket body being formed of a metal having a thickness of 0.5 to 3.0 mm.

24. A gasket as claimed in claim 21 wherein the height of said lower sealing section is smaller than the height of said upper sealing section.

25. A gasket as claimed in claim 21 wherein said lower and upper sealing sections having a triangular cross sectional shape.

26. A gasket as claimed in claim 21 wherein said lower and upper sealing sections having relatively high circular cross sectional shapes.

27. A gasket as claimed in claim 21 wherein said gasket body having projections extending from said upper face to locally enhance the high sealing force of said upper sealing section.

28. A gasket as claimed in claim 21 wherein said lower sealing section having a trapezoidal cross section and a flat top face.

29. A gasket as claimed in claim 21 wherein said gasket body having a plurality of through holes adjacent but spaced away from said upper face.

30. A gasket as claimed in claim 21 wherein said sealing section adheres to said gasket body absent a bonding agent.

* * * * *